United States Patent
Krish

[11] 3,893,659
[45] July 8, 1975

[54] PRECIPITATOR FOR REMOVING COPPER FROM SOLUTION USING IRON MINI-PELLETS

[75] Inventor: Kris S. Krish, Gibsonia, Pa.
[73] Assignee: Dravo Corporation, Pittsburgh, Pa.
[22] Filed: May 29, 1974
[21] Appl. No.: 474,243

Related U.S. Application Data
[62] Division of Ser. No. 286,451, Sept. 5, 1972, Pat. No. 3,841,865.

[52] U.S. Cl.............. 266/22; 23/272.6 R; 23/273 R; 75/109; 134/10; 134/111; 159/DIG. 25; 210/45; 210/60; 210/197; 209/3; 259/95
[51] Int. Cl.² .................. C22B 3/02; C22B 15/12
[58] Field of Search.... 23/272.6 R, 272.6 A, 267 R, 23/273 R, 285; 75/109, 108; 266/22; 210/197, 189, 223, 43, 51, 60, 45; 259/4, 95; 134/109, 111, 10; 159/DIG. 25; 209/3

[56] References Cited
UNITED STATES PATENTS

| | | | |
|---|---|---|---|
| 691,706 | 1/1902 | Long | 210/197 |
| ,055,836 | 9/1936 | Cowles | 23/272.6 R |
| ,347,073 | 4/1944 | Beekhuis | 23/273 R |
| ,154,411 | 10/1964 | Back | 75/109 |
| ,218,133 | 11/1965 | Ebner | 23/273 R |
| ,390,402 | 6/1968 | Toerg | 134/109 |
| 518,061 | 6/1970 | Laurentz | 23/273 A |
| 540,880 | 11/1970 | Spedden | 75/109 |
| 3,627,496 | 12/1971 | Hermann | 23/273 R |
| R13,668 | 1/1914 | Fickes | 23/272.6 R |

FOREIGN PATENTS OR APPLICATIONS

| | | | |
|---|---|---|---|
| 202,671 | 9/1958 | Austria | 23/272.6 R |
| 642,417 | 5/1928 | France | 23/272.6 R |
| 1,947,336 | 3/1971 | Germany | 75/109 |
| 302,279 | 12/1917 | Germany | 75/109 |
| 41-46940 | 7/1966 | Japan | 75/108 |

OTHER PUBLICATIONS
Groves, RI(BMRI) 6486, 1964, Prec. of Cer. Prod. From Leach Solars After Prec. With Fe, pp. 1 to 23.

*Primary Examiner*—Norman Yudkoff
*Assistant Examiner*—S. J. Emery
*Attorney, Agent, or Firm*—Parmelee, Miller, Welsh & Kratz

[57] ABSTRACT

Improvements in a process and apparatus whereby iron mini-pellet precipitants are dynamically suspended in copper pregnant solutions by constantly introducing fresh pellets and solution into the treatment vessel by bouncing the pellets and fresh solution off a diffuser plate thus creating an upward migratory motion, and by recirculating pellets and solution from the bottom of the vessel to the top creating a vortex. This vortex helps dislodge the particulated copper from the pellet precipitants by directing the pellets into baffle plates. The particulated copper rises with the spent solution and flows out of the vessel.

6 Claims, 1 Drawing Figure

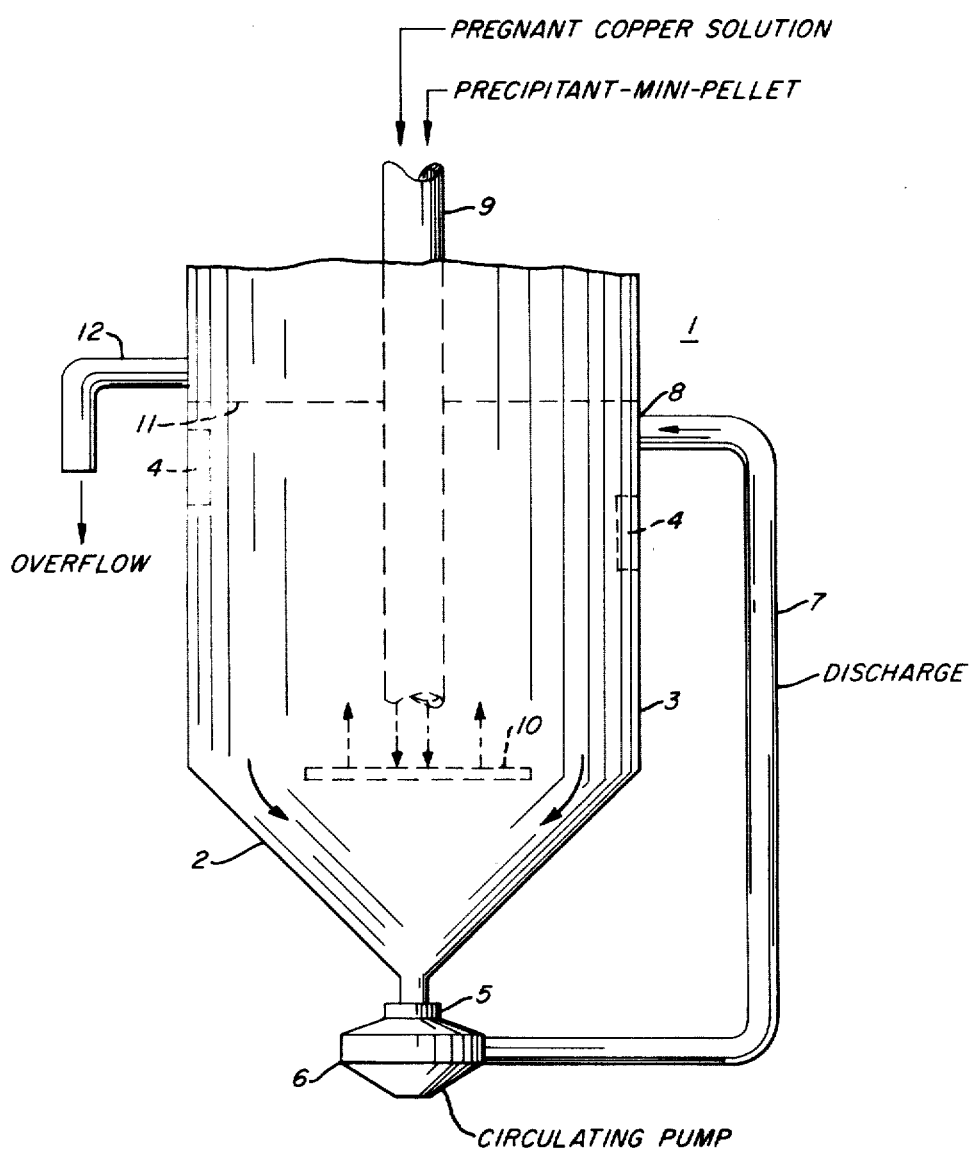

PRECIPITATOR FOR REMOVING COPPER FROM SOLUTION USING IRON MINI-PELLETS

This is a division of application Ser. No. 286,451, filed Sept. 5, 1972, now U.S. Pat. No. 3,841,865, patented Oct. 15, 1974.

FIELD OF THE INVENTION

This invention relates to the art of precipitating substances, particularly metals such as copper from solutions containing same, onto solid precipitants such as metallic iron.

PRIOR ART

It has long been common practice to precipitate metals from solution on other metals higher in the electromotive series than the metal to be precipitated. Thus, the cementation of copper on metallic iron from copper pregnant solutions is a usual method employed by the extractive metallurgical art. Currently there are two methods of recovery. The first is to run the pregnant solution down a launder containing scrap iron, and hosing off and recovering the precipitated copper at intervals. The second recovery method is to utilize what is called a cone precipitator, in which scrap or pelletized iron is disposed inside the cone section and then the pregnant solution is added by pumping it into the apex of the cone. The uprising solution reacts with shredded or pelletized iron and copper is precipitated thereon.

There are problems in the present practises which are solved in the present invention, for example: The reaction rates obtained in both launder and cone type of apparatus are relatively slower. It is difficult to continuously feed shredded or pelletized iron to launder and cone type apparatus. Further it is difficult to keep shredded and pelletized iron in dynamic suspensions.

SUMMARY OF THE INVENTION

The purpose of this invention is to make a more rapid, economical and efficient process and apparatus for the removal of copper from pregnant solutions.

This is accomplished by dynamically suspended iron mini-pellet precipitants in a copper pregnant solution. The dynamic suspension is created by continually bouncing premixed fresh pellets and solution into the solution off a diffuser plate placed below the inflow tube, and be constantly withdrawing solution and pellets from the bottom of the treatment vessel and reentering them into the vessel as a circulating stream. The circulating stream creates a vortex which is dissipated by baffle plates located on the vertical walls of the treatment vessel which serve two additional purposes. The first is to suspend the pellets in the solution by falling out of the vortex after they strike the plates. The second is to dislodge the precipitated copper from the pellets to allow more copper to precipitate into the pellets.

The copper precipitant being finer and lighter migrates to the top of the treatment vessel as does the solution because of the upward impetus given the solution by the diffuser plate. The solution stripped of copper by passing through the dynamically suspended iron pellets, and the precipitated copper, passes upward through a mesh screen and out of the treatment vessel through an overflow pipe into a settling pond.

BRIEF DESCRIPTION OF THE DRAWING

FIG. 1 is a schematic representation of the apparatus used to carry out the invention.

DESCRIPTION OF THE PREFERRED EMBODIMENT

One embodiment of the apparatus of this invention is shown in FIG. 1 and consists of a cylindrical treatment vessel 1 which consists of an inverted cone section 2 having a wall which slants apart in an upward direction and connects to a substantially vertical wall portion 3. The lower section is conical to prevent adherence of solid particles thereon. Welded perpendicular to the inside of the vertical wall are several short oblong baffle plates 4. The conical section 2 is connected at its apex to a suction flange 5 of a centrifugal pump 6, mounted vertically and driven by a suitable electric motor. Connected to the centrifugal pump 6 is a discharge pipe 7 which terminates tangentially at the top of the cylindrical treatment vessel 1 at a point 8. A cylindrical down pipe 9 placed over the apex of the cone extends from the top of the treatment vessel to the top of the inverted cone section 2 and is supported by suitable angles and braces, not shown. A circular stainless steel diffuser plate 10, supported by suitable angles and braces not shown, is disposed centrally within vessel 1, proximate the top of the cone section 2, and is a distance equal to twice the diameter of the down pipe, away from the bottom of the down pipe. The diffuser plate 10 is disposed transverse to the longitudinal axis of the vertically disposed down pipe 9 and has a cross sectional area which is three times as large as that of the down pipe 9. There is also a stainless steel number ten size mesh screen 11 located above the pump discharge pipe entry point 8, and extending over the entire cross-section of the treatment vessel. This mesh may vary, however, it must be of size that permits the copper particles to escape the vessel, and yet small enough to restrain the still unseable iron mini-pellets from escaping the vessel. Above the screen in the wall of treatment vessel 1 an overflow pipe 12 is provided which leads to a settling tank (not shown).

In one method of practicing this invention copper pregnant solution and iron mini-pellet-precipitant of about ⅛ inch average diameter are introduced into the treatment vessel 1 through the down pipe 9. As the solution and mini-pellets are discharged from the down pipe they bounce off diffuser plate 10 and are dispersed and diffused in a violent manner. Solution and pellets bouncing off diffuser plate 10 also provides necessary turbulence to retain a condition of dynamic suspension in the system. A portion of both the solution and the mini-pellets are drawn into the suction side of the circulating pump 6, at a rate of normally 3–6 times the inflow rate of the incoming mixture of pellets and pregnant copper solution, and pumped through the discharge pipe 7. The pipe 7 discharges in a tangential manner at point 8 creating a vortex which is broken up by baffle plates 12 to assist in maintaining a state of dynamic suspension. This constant and rapid recirculating of solution and precipitant mini-pellets effectively increases the possible reaction time without a corresponding increase in the volume of the apparatus.

The precipitated copper, resulting from the chemical reaction between the pregnant copper solution and pre-reduced mini-pellets, is separated from the iron mini-pellets by the collisions between the pellets and the collisions between the pellets and baffle plates 4. This particulare copper and spent solution migrate upward in treatment vessel 1 through the screen mesh 11, which prevents partially reacted mini-pellets from escaping the system, and flows out of treatment vessel 1 through overflow pipe 12, into a settling pond, (not shown).

A typical copper pregnant solution would consist of copper sulfate in sulfuric acid, and a typical ratio of iron to copper would be about 1.2 pounds of pelletized iron with every 1 pound of copper in solution. The percentage of recovery is extremely high.

In the past, the inventions utilized have been time consuming since scrap and/or pelletized iron had to be removed so that the copper could be separated. If the copper was dislodged from the iron and removed, during the reaction, time still had to be spent adding fresh iron so that the reaction could continue. Also the volume of copper was limited since either the fresh solution or the iron precipitants was quickly used up.

In this invention, fresh copper solutions and iron precipitants are constantly being added thus the reaction never ceases due to a lack of agents and greater volumes are handled more rapidly. Further by keeping the solutions in a constant state of agitation the precipitated copper is dislodged from the iron freeing the iron to react once again. In addition since this process requires only one treatment vessel to achieve maximum results, a relatively small reaction vessel can be used to process larger quantities of copper.

The provision of a recirculating loop in which a portion of the solution and precipitant are constantly recirculated at a high flow rate permits optimizing the volume of solution which can be handled using a treatment vessel of limited size.

It should be realized that by the term mini-pellets we also means crushed iron pellets.

It also must be understood that the treatment vessel and other apparatus exposed to solution be constructed of stainless steel to prevent the copper from precipitating onto the apparatus.

I claim:

1. An apparatus for precipitating copper from pregnant solution onto iron precipitant-mini-pellets and dislodging the precipitated copper therefrom, and for removing the copper from the solution comprising:

a treatment vessel of generally conical formation having an apex directed downwardly and an open base facing upwardly, a vertically disposed inflow pipe centrally disposed relative to the vessel, which inflow pipe ends proximate the top of the inverted cone formation, for continuously introducing into the treatment vessel at its open end pregnant solution and iron pellets;

a diffuser plate placed a short distance immediately below and transverse to the axis of the inflow pipe, with the inflowing mixture being directed against the diffuser plate, to dynamically suspended the inflowing mixture whereby the copper precipitates on the iron pellets and is thereafter dislodged therefrom;

a circulating pump at the lower apex of said vessel, the pumping rate of which exceeds the rate of the new inflowing solution, for constantly drawing off a portion of the mixture of precipitant-mini-pellets and pregnant solution;

conduit means connected to said circulating for constantly returning the drawn off mixture tangentially to the upper part of the treatment vessel as a circulating stream;

means for allowing spent solution and precipitated copper to escape from the upper part of the treatment vessel, said escape means being a screen means with openings of a size which allows the particulate copper and not the iron pellets to escape the treatment vessel; and, an overflow tube located above said screen means.

2. Apparatus as in claim 1 wherein said means for constantly drawing off mixture is a centrifugal pump the pumping rate of which exceeds the rate of the new inflowing solution.

3. Apparatus as in claim 2 wherein said circulating pump has a capacity which is six times the volume of that of the new inflowing solution.

4. Apparatus as in claim 1 wherein baffle plates are disposed perpendicular to the interior walls of said treatment vessel whereby the vortex created by recirculation from the discharge pipe is dissipated.

5. Apparatus as in claim 1 wherein said means to allow precipitated metal and spent solution to escape treatment vessel is a stainless steel screen with a mesh of a size which allows the particulate copper and not the iron pellets to escape the treatment vessel, and an overflow tube located above the screen.

6. Apparatus as in claim 1 wherein said diffuser plate is placed at a distance equal to twice the diameter of the inflow pipe below and transverse to the axis of the down pipe, and has a cross-section area approximately three times that of the inflow pipe.

* * * * *